United States Patent [19]

Simpson et al.

[11] 4,284,531

[45] Aug. 18, 1981

[54] METHANATION CATALYSTS AND PROCESS FOR THEIR PREPARATION

[75] Inventors: Howard D. Simpson; Hugh W. Gowdy, both of Irvine; Steven D. Light, Fullerton, all of Calif.

[73] Assignee: Union Oil Co. of California, Brea, Calif.

[21] Appl. No.: 72,662

[22] Filed: Sep. 5, 1979

[51] Int. Cl.³ .................... B01J 21/04; B01J 23/64; B01J 23/84; B01J 23/86

[52] U.S. Cl. .................... 252/465; 252/455 Z; 252/456; 252/458; 252/459; 252/460; 252/464; 252/466 J; 252/466 A; 252/466 B; 252/468; 252/470; 252/472; 48/213

[58] Field of Search ............. 252/465, 455 Z, 456, 252/458, 459, 460, 464, 466 J, 466 A, 468, 470, 472, 466 B; 48/213; 260/449.6 M

[56] References Cited

U.S. PATENT DOCUMENTS

| | | | |
|---|---|---|---|
| 3,759,679 | 9/1973 | Franz et al. | 48/213 |
| 3,988,334 | 10/1976 | Finch et al. | 252/465 X |
| 4,065,514 | 12/1977 | Bartley et al. | 48/213 |

*Primary Examiner*—W. J. Shine
*Attorney, Agent, or Firm*—Dean Sandford; Cleveland R. Williams

[57] ABSTRACT

Methanation catalysts and process for preparing and using the same are disclosed; said methanation catalysts being especially suitable for producing synthetic fuel gas, from either naturally occurring liquid hydrocarbons or synthetic liquid hydrocarbons produced from solid carbonaceous materials, the product gas having substantially the same heating value and density as natural gas and which may be intermingled therewith and distributed through the same pipe lines.

The methanation catalyst comprises an interspersed mixture of metals selected from Groups IV(B), V(B), VI(B) and VIII metals of the Periodic Table, composited with an inorganic refractory oxide support or matrix.

19 Claims, No Drawings

METHANATION CATALYSTS AND PROCESS FOR THEIR PREPARATION

BACKGROUND OF THE INVENTION

1. Field of the Invention

This invention relates to methanation catalysts suitable for methanating naturally occurring liquid hydrocarbons or synthetic liquid hydrocarbons, prepared from solid carbonaceous materials, to produce synthetic fuel gas. The method of preparation involves sequentially impregnating an inorganic refractory oxide support or matrix with either Group IV(B), V(B) or VI(B) metals in combination with Group VIII metals of the Periodic Table.

Around the turn of the century, coal was displaced as an energy source by oil and gas in the commercial and, to a large extent, the residential markets because it was more difficult to handle than other fuels and, additionally, leaves a residue that must be disposed of in the form of dirt and dust.

The shrinking petroleum and natural gas reserves around the world, increased demand and recently enacted governmental sulfur oxides emission standards in the United States, have highlighted the need to focus attention on clean burning synthetic fuels which approximate the properties and characteristics of natural gas.

Presently, utility companies which supply and distribute natural fuel gas for residential and commercial use have an increasingly acute need for an economical method of supplying fuel gas during peak-load periods, especially in frigid areas that depend upon natural gas to heat residential units. During cold weather, demand for fuel gas may be double or triple the volume used on a mild day. One method of meeting the peak-load demand is to add propane-air mixtures to the gas. However, the amount of propane-air that may be added to gas is limited and there is a real need for an economical process that can be used to supply peak-load demand for fuel gas.

Fossil fuels, which took nature millions of years to form, are currently being consumed at such prodigious rates that petroleum and gas supplies may be good for only 50 to 70 more years and coal supplies for two or three more centuries. World wide accelerating demand for fuel has contributed to the present energy crisis. Natural gas, typically, contains about 94.9 percent methane. Since natural gas appears to be the most scarce of the fossil fuels, the development of an economical process for producing synthetic natural gas or substantially pure methane from either solid or liquid hydrocarbons is of considerable importance.

2. Description of the Prior Art

Processes and catalysts for the gasification of liquid hydrocarbons and carbonaceous materials to produce synthetic fuel gas are known and appreciated by the prior art. For example, U.S. Pat. No. 3,928,000 discloses a process for converting hydrocarbonaceous materials into a clean methane-rich gas stream which may be burned as a fuel. Particularly, a hydrocarbonaceous fuel is gasified by partial oxidation to produce a process gas stream which is cooled, cleaned and subjected to catalytic methanation over a sulfur-resistant catalyst comprising Co, Cr, W, Mo or Ni and mixtures thereof supported on a structure formed from Group III and IV elements; for example, alumina, silica, zeolite, etc.

Another process is disclosed in U.S. Pat. No. 3,712,800 which relates to a method for converting residual oils into fuel gas. The method consists of contacting an oil feed, under methanation conditions, with a metallic modifying agent which contains vanadium, nickel, or a dispersible iron compound, and mixtures thereof.

U.S. Pat. No. 4,065,514 relates to a process for preparing methane using a catalyst consisting of a silica-alumina support composited with an iron group metal in combination with a metal of the platinum-palladium group wherein each of said metals is substantially uniformly distributed throughout the body of said support.

U.S. Pat. No. 3,506,417 discloses a process for the production of methane-containing gases from propane feedstocks which comprises contacting a propane feedstock and steam, under methanation conditions, with a catalyst selected from (a) a silica supported nickel or (b) a supported platinum group metal, both promoted with an alkali metal or alkaline earth metal. The gases thus produced are said to be fungible with natural gas.

Another process for methane synthesis is set forth in U.S. Pat. No. 3,930,812, which relates to a process for the catalytic production of methane from carbon oxides and hydrogen, which are produced from the gasification of fossil fuels or aliphatic alcohols with steam and/or oxygen. Particularly, the reference teaches the reaction of an alcohol, for example methanol, with steam and/or oxygen over an iron oxide/chromium oxide catalyst to provide a feedstock for further methanation. The feedstock thus produced is contacted, under methanation conditions, with a catalyst comprising raney nickel and metals of Group VIII of the Periodic Table.

U.S. Pat. No. 4,039,302 relates to a process and catalyst suitable for synthesizing low boiling aliphatic hydrocarbons ($C_1$ to $C_3$) from carbon monoxide and hydrogen. The carbon monoxide and hydrogen are obtained from materials such as bituminous coal, lignite, oil shale, crude oil and fuel oils using conventional techniques. Low boiling aliphatic hydrocarbons are prepared by contacting carbon monoxide and hydrogen with a catalyst comprising an interspersed mixture of cobalt oxide, aluminum oxide, zinc oxide and molybdenum oxide under reaction conditions.

A methane-rich gas process is disclosed in U.S. Pat. No. 3,927,999 which relates to the catalytic methanation of synthesis gas feed comprising hydrogen and carbon monoxide obtained from the gasification of a solid carbonaceous material or a liquid hydrocarbon. The synthesis gas feed is contacted, under methanation conditions, with a catalyst comprising nickel oxide and aluminum oxide.

As can readily be determined from the above, there is an ongoing search for new and more efficient processes for producing synthetic fuel gas from both solid and liquid carbonaceous materials.

SUMMARY OF THE INVENTION

The present invention resides in catalyst compositions and a method for producing the same. The catalysts are suitable for producing synthetic fuel gas, from either solid carbonaceous materials or liquid hydrocarbons, which approximate natural gas in density and heating value.

Essentially, the present invention comprises methanation catalysts suitable for use in the synthesis of synthetic fuel gas from either naturally occurring liquid hydrocarbons or synthetic liquid hydrocarbons produced from solid carbonaceous materials, said methanation catalysts comprising an interspersed mixture of metals selected from Groups IV(B), V(B) or VI(B) metals and Group VIII metals of the Periodic Table, composited with an inorganic oxide support or matrix; said methanation catalyst being additionally characterized as having an average pore diameter of from about 60 Å; to about 400 Å; a surface area ranging from about 50 M$^2$/g to about 500 M$^2$/g; a pore volume of from about 0.2 cc/g to about 0.8 cc/g; a compacted bulk density of from about 0.6 to about 1.2; and wherein the Group IV(B), V(B), or VI(B) metals; the Group VIII metals; and the inorganic oxide support or matrix in the methanation catalyst are in a molar ratio of from about 10:20:70 to about 1:1:98.

A process is disclosed for preparing methanation catalysts suitable for use in the synthesis of synthetic fuel gas from either naturally occurring liquid hydrocarbons or synthetic liquid hydrocarbons produced from solid carbonaceous materials, which comprises (A) forming a mixture by impregnating an inorganic oxide support or matrix with a Group VIII metal; (B) drying and calcining the resultant mixture; (C) impregnating the mixture with either a Group IV(B), V(B) or VI(B) metal and a second Group VIII metal; and (D) drying the resultant catalyst. Alternatively the resultant catalyst may be calcined at a temperature of from about 400° F. to about 1200° F., for about ¼ hours to about 4 hours.

This invention additionally encompasses a process for synthesis of methane-containing synthetic fuels from either a natural liquid hydrocarbon feedstock or a synthetic liquid hydrocarbon feedstock derived from a solid carbonaceous material, which comprises contacting said natural or synthetic liquid hydrocarbon feedstock in combination with hydrogen, under methanation conditions, with a methanation catalyst comprising an interspersed mixture of metals selected from either Group IV(B), V(B) or VI(B) metals in combination with Group VIII metals of the Period Table, composited with an inorganic refractory oxide support or matrix.

DESCRIPTION OF THE INVENTION

This invention resides in improved methanation catalysts and a method for preparing the same. The catalysts are particularly suited for preparing synthetic fuel gas from either solid carbonaceous materials, in the form of synthetic liquid hydrocarbons produced therefrom, or from natural liquid hydrocarbons.

The methanation catalyst preferably comprises an interspersed mixture of metals selected from either Group IV(B), V(B) or VI(B) and mixtures thereof in combination with Group VIII metals of the Periodic Table, composited with an inorganic refractory oxide support or matrix.

The preferred support or matrix herein is an inorganic refractory oxide selected from the group consisting of boehmite alumina, silica hydrosol, colloidal silica, zeolite, diatomite, titania, zirconia, hafnia and bentonite clay and mixtures thereof. Other suitable inorganic refractory oxides include magnesia or beryllia and mixtures thereof. The preferred inorganic refractory oxide is alumina.

Metals from Groups IV(B), V(B) or VI(B) and Group VIII of the Periodic Table are preferably interspersed with an inorganic refractory oxide to impart the desirable activity and thermal stability to the catalyst. A Periodic Table marketed by the Sargent-Welch Scientific Company, Skokie, Illinois, may be consulted to determine the metals included in Groups IV(B), V(B), VI(B) and VIII. Group IV(B) metals particularly suitable for use herein include titanium, zirconium or hafnium and mixtures thereof. The Group V(B) metals herein include vanadium, niobium (columbium) or tantalum and mixtures thereof. Those from Group VI(B) include chromium, molybdenun or tungsten and mixtures thereof. The Group VII metals herein are preferably selected from the group consisting of iron, cobalt, nickel, ruthenium, rhodium, palladium, osmium, iridium, or platinum and mixtures thereof. The preferred metals are nickel or platinum and mixtures thereof. The metals disclosed herein may be in salt form, acid form or introduced into the catalyst as an oxide.

Normally, the Group IV(B), V(B) or VI(B) metals, in combination with Group VIII metals, and inorganic refractory oxide are combined in a molar ratio of from about 10:20:70 to about 1:1:98, preferably from about 10:10:80 to about 1:9:90. It should be noted that the catalysts herein in a preferred mode, contain two metals selected from the Group VIII metals of the Periodic Table. The two preferred Group VIII metals are nickel and platinum. However, any combination of the Group VIII metals may be substituted for the nickel and platinum without detrimentally affecting the catalyst activity and thermal stability. When two Group VIII metals are utilized, they normally are used in a molar ratio of from about 1:1 to about 1:1000, preferably from about 1:10 to about 1:500.

The final methanation catalyst is characterized as having an average pore diameter of from about 60 Å to about 400 Å, preferably from about 80 Å to about 200 Å; a surface area ranging from about 50 M$^2$/g to about 500 M$^2$/g, especially from about 100 M$^2$/g to about 300 M$^2$/g; a pore volume of from about 0.2 cc/g to about 0.8 cc/g, preferably from about 0.3 cc/g to about 0.6 cc/g; and a compacted bulk density of from about 0.6 to about 1.2 especially from about 0.8 to about 1.0.

It should be noted that the Group VIII metal is first composited or interspersed with the inorganic refractory oxide support or matrix and the mixture is dried and calcined to form a barrier between the support or matrix and Group IV(B), V(B) or VI(B) metal which is next, in combination with a second Group VIII metal, composited with the above calcined mixture. The catalyst may be either dried and reacted with a feedstock to produce methane or subjected to a second calcination step to prepare the final catalyst.

The catalyst is normally dried at a temperature of from about 180° F. to about 250° F. for about ¼ hour to about 4 hours, preferably from about 200° F. to about 230° F. for about 1 hour to about 2 hours. The physical form of the catalysts of this invention depends to a large extent on the technique of drying. For example, the composites may be filtered and oven-dried and coarse granules may be obtained by breaking up and sieving the oven-dried cake up to any desired size. Spray-drying the catalyst, such that, the dried catalyst will pass through a 300-mesh sieve is another method of producing the desired catalyst. Another method involves shape-boring the catalyst into a desired configuration using a restraint to maintain the desired shape and drying the catalyst. A particularly desirable shape is a cloverleaf or three-lobe configuration.

Calcination preferably occurs after the Group VIII metal has been composited with the inorganic refractory oxide. Alternatively, a second calcination may take place after formation of the final catalyst. Usually calcination is performed in an atmosphere containing oxygen, e.g., air, at a temperature from about 400° F. to about 1,200° F. for about ¼ hour to about 4 hours, preferably from about 700° F. to about 1,000° F. for about ½ hour to about 2 hours.

Hydrocarbon feedstocks suitable for use in the methanation process herein include either natural or synthetic liquid hydrocarbons. Natural liquid hydrocarbons suitable for use herein as feedstock include such diverse materials as liquefied petroleum gas, petroleum distillates and residues, gasoline, naphtha, kerosine, crude petroleum, gas oil, residual oil, tar-sand and shale oil, aromatic hydrocarbons, for example, benzene, toluene, and xylene fractions, paraffinic compounds, such as ethane, propane, butane, pentane, hexane, etc., olefinic compounds, such as ethylene, propylene, butylene, etc., and mixtures thereof.

Synthetic liquid hydrocarbons may be derived from solid carbonaceous materials such as anthracitic materials, bituminous and sub-bituminous coal, lignitic materials, peat, coke, coal oil and other types of coal products referred to in ASTM Designation: D-388-66 (reapproved 1972). Conventional techniques and apparatus may be used to upgrade the solid carbonaceous material to a synthetic liquid hydrocarbon feedstock. For example, high temperatures and pressures in combination with either hydrogen gas and/or a hydrogenation catalyst and solvent are suitable for producing a desirable synthetic hydrocarbon feedstock from a solid carbonaceous material. A typical process and apparatus for producing liquid hydrocarbons from solid carbonaceous materials is disclosed in U.S. Pat. Nos. 4,032,429 and 4,081,361, the disclosures of which are incorporated herein by reference.

Solid carbonaceous materials and conveniently converted to synthetic liquid hydrocarbon feedstock by contacting the solid carbonaceous material with hydrogen, a solvent and a standard hydrogenation catalyst at a reaction temperature between 500° F. to about 900° F., a reaction pressure of from about 500 p.s.i.g. to about 10,000 p.s.i.g. and a space velocity of from about ½ to about 2 pounds of solid carbonaceous material per pound of catalyst per hour. Hydrogen is introduced into the reaction at a hydrogen flow rate of from about 8,000 to about 25,000 SCF of hydrogen per ton of dry solid carbonaceous feedstock per hour.

The methanation reaction is conveniently carried out by contacting either a naturally occurring liquid hydrocarbon feedstock or a synthetic liquid hydrocarbon feedstock with a methanation catalyst comprising an interspersed mixture of metals selected from either Group IV(B) V(B) or VI(B) metals in combination with Group VIII metals of the Periodic Table, composited with an inorganic refractory oxide support or matrix. The liquid hydrocarbon feedstock and methanation catalyst are contacted at a reaction temperature between 500° F. and 1,500° F., preferably between 600° F. and 900° F., a pressure of from about 50 p.s.i.g. to 15,000 p.s.i.g., preferably from about 100 p.s.i.g. to about 10,000 p.s.i.g. and a liquid hourly space velocity of from about 0.5 to about 5.0, especially from about 0.5 to about 3.0 volumes of natural or synthetic liquid hydrocarbon feedstock per volume of methanation catalyst per hour. Hydrogen is introduced into the reaction at a hydrogen flow rate of from about 100 to about 15,000, especially from about 100 to about 10,000 SCF of hydrogen per barrel of natural or synthetic liquid hydrocarbon feedstock per hour. It should be noted that the synthetic fuel gas prepared herein predominates in methane gas and approximates natural gas in heating value and density. Additionally, the synthetic fuel gas may be intermingled with natural gas and distributed through a common distribution system.

The invention will be further described with reference to the following Examples.

EXAMPLE I

A methanation catalyst is prepared by impregnating 100 grams of alumina support or matrix with 85 ml of an aqueous solution containing 74 grams of nickel nitrate hexahydrate as $Ni(NO_3)_2.6H_2O$. The excess fluid is separated from the support or matrix with a Büchner funnel. Analysis indicates that 18 ml of the aqueous fluid is recovered, indicating that 58 grams of nickel nitrate or 11.8 grams of Ni has been absorbed onto the support or matrix. The composite is air dried for one hour at ambient temperature, oven dried at 230° F. for one hour, and calcined for 15 minutes at 800° F. in flowing air. Next, 47 grams of chromium III nitrate enneahydrate, $Cr(NO_3)_3.9H_2O$, are dissolved in 50 ml of an aqueous solution containing 0.00843 gram of platinum per ml as chloroplatinic acid ($H_2PtCl_6.6H_2O$). The final solution volume is 76 ml. The previously calcined composite of alumina support or matrix and nickel is immersed in the solution for 2 minutes with agitation, after which 10 ml of excess solution are removed with a Büchner funnel. The calculated amounts of chromium and platinum incorporated into the catalyst from the 66 ml of absorbed solution are 5.3 grams and 0.4 gram respectively. The calculated catalyst composition is 0.3 percent platinum, 4.5 percent chromium, and 10.0 percent nickel on alumina, as $Al_2O_3$. The catalyst is air dried for about 1 hour and oven dried overnight at 230° F. The catalyst is not calcined, however, it is loaded into a pressure resistant reactor under a nitrogen atmosphere at room temperature, and heated in flowing hydrogen from ambient temperature to 700° F. at a rate of 25° F. per hour. This temperature is held for two hours. The catalyst is now ready to methanate a liquid hydrocarbon feedstock.

The above catalyst has a composition of 10 percent nickel, 4.5 percent chromium, and 0.3 percent platinum. The catalyst is further characterized as having a compacted bulk density of 0.91 grams/cc; a pore volume of 0.45 cc/gram; an average pore diameter of 110 A; and a surface area of 170 m²/gram.

EXAMPLE II

A methanation catalyst is prepared by impregnating 100 grams of alumina reforming catalyst support or matrix with 85 ml of an aqueous solution containing 74 grams of nickel nitrate. The alumina support or matrix is soaked in the above-aqueous solution for 3 minutes with agitation. Excess solution is separated using a Büchner funnel and discarded. The preparation is air dried for 30 minutes, oven dried at 230° F. for 30 minutes and calcined in flowing air at 800° F. for 15 minutes.

Next, 6.5 grams of vanadium, as ammonium vanadate ($NH_4VO_3$), is placed in 50 ml of water. The above mixture is heated to 160° F. The mixture is agitated for 15 minutes and about 30 grams of oxalic acid is added, with agitation producing a clear solution with a dark blue color. Next, 0.42 gram of platinum as chloroplatinic acid is dissolved in the mixture. The nickel-alumina preparation is soaked in the above mixture for 2 minutes with agitation. Excess solution is separated with a Büchner funnel. The catalyst is oven dried at 230° F. for two hours and calcined at 800° F. for 30 minutes. The final catalyst contains 9.3 percent nickel; 3.8 percent vanadium and 0.3 percent platinum.

EXAMPLE III

The procedure of Example I is followed to prepare a methanation catalyst, with the following exception: 4.4 grams of titanium as $Ti_2(C_2O_4)_3 \cdot 10H_2O$ dissolved in 50 ml of hot aqueous solution containing 0.00843 gram platinum/ml as chloroplatinic acid is substituted for the chromium III nitrate ennea-hydrate and chloroplatinic acid and the prepared catalyst is calcined at 800° F. for 30 minutes. The catalyst has a final composition of 10 percent nickel, 4 percent titanium, and 0.3 percent platinum based on the weight of the alumina support or matrix.

EXAMPLE IV

A methanation catalyst is prepared by adding 45 grams of nickel nitrate to sufficient water to give 100 ml of an aqueous solution. One hundred grams of a silica-alumina support or matrix containing sufficient ($4SiO_2 \cdot Al_2O_3$) dispersed in alumina to give 40 percent silica and 60 percent alumina is immersed in the aqueous solution for 4 minutes with agitation. The effective pore volume of the silica-alumina support or matrix is 1.0 cc/gram. The above preparation is dried at 230° F. for 30 minutes.

Next, 36 grams of chromium nitrate ennea-hydrate and 1.9 grams of chloroplatinic acid are dissolved in sufficient water to prepare a 100 ml solution. The nickel impregnated support or matrix is immersed in the above solution with agitation for 2 minutes and the excess aqueous solution is removed using a Büchner funnel. The catalyst is dried at 230° F. for 2 hours and calcined at 800° F. for 30 minutes.

EXAMPLE V

A synthetic fuel gas is prepared by charging a pressure resistant vessel with a shale oil having the following properties:

TABLE I

| Gravity, °API | 22.70 |
|---|---|
| Distillation, Modified vacuum Engler | |
| IBP/5[1] | 139/350° F. |
| 10/20 | 400/499° F. |
| 30/40 | 588/658° F. |
| 50/60 | 731/789° F. |
| 70/80 | 847/898° F. |
| 90/95 | 960/1009° F. |
| EP/% Rec[2] | 1077° F./99.0% |
| Carbon | 84.80 Wt % |
| Hydrogen | 11.61 Wt % |
| Nitrogen | 1.74 Wt % |
| Sulfur | 0.81 Wt % |
| Oxygen | |
| By difference | 1.03 Wt % |
| By gas chromatrograph | 0.90 Wt % |
| Arsenic | 40 PPM |
| Chlorine | 2 PPM |
| Fe/Ni/V | 4.6/2.3/1.4 PPM |
| Ash | 300-3000 PP, |
| Asphaltenes | 1.1 Wt % |
| Carbon residue, ASTM:D-189 | 2.1 Wt % |
| Flash Point, PMCC[3] | 79° F. |
| Heat of Combustion | 18,043 BTU/lb |
| Pour Point | 60° F. |
| Viscosity | |
| SUS 100° F. | 102.60 |

TABLE I-continued

| SUS 210° F. | 37.80 |
|---|---|
| Water, BS & W[4] | 0.04 vol. % |
| Water, Fischer[5] | 0.30 vol. % |

[1]IBP = Initial boiling point.
[2]EP/% Rec. = End Point/% Recovery.
[3]PMCC = Pensky-Martin Closed Cup Flash Point.
[4]BS & W = Basic Sediment and Water.
[5]Fischer - Standard Karl Fischer titration for water in Petroleum and Related Products.

Shale oil substantially as described above, hydrogen and a methanation catalyst comprising 9.3 percent nickel, 3.8 percent vanadium and 0.3 percent platinum composited on an alumina support or matrix, are charged into a pressure resistant reaction vessel. The reaction temperature is maintained at 900° F. and the pressure is 2,500 p.s.i.g., with a hydrogen flow rate of 10,000 SCF of hydrogen per barrel of retort shale oil per hour. The shale oil and catalyst are contacted at a liquid hourly space velocity (LHSV) of 2.0 volumes of shale oil per volume of catalyst per hour. Essentially all of the shale oil is converted to a synthetic fuel gas which comprises a predominance of methane gas.

EXAMPLES VI-VIII

Synthetic fuel gas is prepared from a liquid hydrocarbon feedstock having the following composition:

TABLE 2

| Component | Weight % |
|---|---|
| N-Hexane | 87.1 |
| Isohexanes | 3.5 |
| Methylcyclopentane | 9.3 |
| $C_7$ paraffins | 0.1 |

The above-described liquid hydrocarbon feedstock, hydrogen and a methanation catalyst comprising 10.0 percent nickel, 4.5 percent chromium and 0.3 percent platinum composited on an alumina support or matrix, are charged into a pressure resistant reaction vessel. The methanation reaction is conducted at the below described temperature, and at a pressure of 100 p.s.i.g. with hydrogen at a flow rate of 5,000 SCF of hydrogen per barrel of liquid hydrocarbon feedstock per hour. The catalyst and liquid hydrocarbon feedstock are contacted at a liquid hourly space velocity (LHSV) of 2.0 volumes of liquid hydrocarbon feedstock per volume of catalyst per hour. The results are indicated in Table 3 below.

TABLE 3

| | METHANATION RESULTS | | |
|---|---|---|---|
| | EX. VI | EX. VII | EX. VIII |
| Temperature | 700° F. | 800° F. | 900° F. |
| Component, yield | Wt. % | Wt. % | Wt. % |
| Methane | 79.2 | 88.4 | 87.2 |
| $C_2+$ paraffins | 18.1 | 10.9 | 12.3 |
| $C_6+$ paraffins | 15.0 | 8.3 | 9.9 |
| $H_2$ Consumed | | | |
| SCF/BBL | 4090.0 | 4431.0 | 4316.0 |

The above yields are based upon the amount of product produced. Substantially all of the liquid hydrocarbon feedstock is converted to a synthetic fuel gas.

As can readily be determined from the above, a synthetic fuel gas is produced which predominates with methane. The synthetic fuel gas may be admixed with natural gas and used to produce energy for either residential or industrial purposes.

EXAMPLE IX

A synthetic fuel gas is prepared by charging a pressure resistant vessel with the catalyst of Example I and a typical synthetic liquid hydrocarbon prepared from a solid carbonaceous material, having the following properties:

TABLE 4

| Boiling Range of Fraction, °F. | Saturates % | Olefins % | Aromatics % | Resins % |
|---|---|---|---|---|
| Room Temp.- 345 | 68.0 | 5.5 | 26.5 | — |
| 345–397 | 32.0 | 2.5 | 65.5 | — |
| 397–444 | 20.0 | 1.5 | 78.5 | — |
| 444–477 | 5.5 | 1.0 | 93.5 | — |
| 477–506 | 3.0 | 1.0 | 96.0 | — |
| 615–646 | 2.5 | — | 90.9 | 6.6 |
| 646–662 | 4.0 | — | 85.0 | 10.7 |
| 662–687 | 5.0 | — | 83.0 | 12.0 |
| 687–705 | 4.9 | — | 85.1 | 10.0 |
| 705–736 | 5.8 | — | 82.7 | 11.5 |
| 736–772 | 9.4 | — | 75.5 | 14.2 |
| 772–914 | 9.2 | — | 68.8 | 21.0 |
| 914–1006 | 2.0 | — | 63.0 | 34.8 |
| 1006 + (Bottoms)* | | | | |

*Bottoms contains approximately 0.1% saturates + aromatics, 0.3 Resins, 60.6% asphaltenes and 38.9% Benzene Insolubles.

A synthetic liquid hydrocarbon feedstock substantially as described above, hydrogen and the methanation catalyst of Example I are charged into a pressure resistant reaction vessel. The reaction temperature is maintained at 900° F. and at a pressure of 2,500 p.s.i.g. with a hydrogen flow rate of 15,000 SCF of hydrogen per barrel of synthetic liquid hydrocarbon feedstock per hour. The synthetic liquid hydrocarbon feedstock and methanation catalyst are contacted at a liquid hourly space velocity (LHSV) of 1.5 volumes of synthetic liquid hydrocarbon feedstock per volume of catalyst per hour. It should be noted that essentially all of the synthetic liquid hydrocarbon feedstock is converted to a synthetic fuel gas which contains a substantial amount of methane.

Obviously, many modifications and variations of the invention, as hereinbefore set forth, may be made without departing from the spirit and scope thereof, and therefore only such limitations should be imposed as are indicated in the appended claims.

We claim:

1. A methanation catalyst suitable for use in the synthesis of synthetic fuel gas from liquid hydrocarbons, said methanation catalyst comprising an interspersed mixture of metals selected from Groups IV(B), V(B), or VI(B), in combination with two Group VIII metals, composited with an inorganic refractory oxide support or matrix; said methanation catalyst having an average pore diameter of from about 60 Å to about 400 Å; a surface area ranging from about 50 M$^2$/g to about 500 M$^2$/g; a pore volume of from about 0.2 cc/g to about 0.8 cc/g; a compacted bulk density of from about 0.6 to about 1.2; and wherein said catalyst comprises either Group IV(B), V(B) or VI(B) metals or a mixture thereof; combined with two Group VIII metals; and an inorganic refractory oxide support or matrix in a molar ratio range of from about 10:20:70 to about 1:1:98.

2. The methanation catalyst of claim 1 wherein the Group IV(B), V(B) or VI(B) metals are selected from the group consisting of titanium, zirconium, hafnium, vanadium, niobium, tantalum, chromium, molybdenum and tungsten and mixtures thereof.

3. The methanation catalysts of claim 1 wherein the Group VIII metals are selected from the group consisting of iron, cobalt, nickel, ruthenium, rhodium, palladium, osmium, iridium and platinum and mixtures thereof.

4. The methanation catalyst of claim 1 wherein the inorganic refractory oxide support or matrix is a member selected from the group consisting of alumina, silica, magnesia, zeolite, diatomite, titania, zirconia and hafnia and mixtures thereof.

5. The methanation catalyst of claim 1 wherein the Group VI(B) metal is chromium.

6. The methanation catalyst of claim 1 wherein the Group VIII metal is selected from nickel or platinum and mixtures thereof.

7. The methanation catalyst of claim 4 wherein the inorganic refractory oxide support or matrix is alumina.

8. A methanation catalyst suitable for use in the synthesis of synthetic fuel gas from liquid hydrocarbon, said methanation catalyst comprising an interspersed mixture of chromium, nickel and platinum, composited with alumina; said methanation catalyst having an average pore diameter of from about 60 Å to about 400 Å; a surface area ranging from about 50 M$^2$/g to about 500 M$^2$/g; a pore volume of from about 0.2 cc/g to about 0.8 cc/g; a compacted bulk density of from about 0.6 to about 1.2; and wherein said catalyst comprises chromium; nickel and platinum; and alumina in a molar ratio range of from about 10:20:70 to about 1:1:98.

9. A process for preparing a methanation catalyst suitable for use in the synthesis of synthetic fuel gas from liquid hydrocarbons comprising forming a mixture by impregnating an inorganic refractory oxide support or matrix with a solution of a Group VIII metal compound, drying and calcining the resultant mixture, impregnating the mixture with either a solution of a Group IV(B), V(B), or VI(B) metal compound in combination with a solution of a second Group VIII metal compound, and, drying the resultant catalyst.

10. The process according to claim 9 wherein the inorganic refractory oxide support or matrix is selected from the group consisting essentially of alumina, silica, magnesia, zeolite, diatomite, titania, zirconia, and hafnia and mixtures thereof.

11. The process according to claim 10 wherein the inorganic oxide support or matrix is alumina.

12. The process according to claim 9 wherein the Group VIII metal is selected from the group consisting essentially of iron, cobalt, nickel, ruthenium, rhodium, palladium, osmium, iridium, and platinum and mixtures thereof.

13. The process according to claim 9 wherein the Group VIII metal is selected from nickel or platinum and mixtures thereof.

14. The process according to claim 9 wherein the Group IV(B), V(B) or VI(B) metal is selected from the group consisting essentially of titanium, zirconium, hafnium, vanadium, niobium, tantalum, chromium, molybdenum, and tungsten and mixtures thereof.

15. The process according to claim 9 wherein the Group VI(B) metal is chromium.

16. The process according to claim 9 wherein the methanation catalyst comprises either Group IV(B), V(B) or VI(B) metals or mixtures thereof; two Group VIII metals; and an inorganic refractory oxide support or matrix in a molar ratio range of from about 10:20:70 to about 1:1:98.

17. The process according to claim 9 wherein the inorganic oxide support or matrix and Group VIII metal are dried at a temperature of from about 180° F. to about 250° F., for about ¼ to about 4 hours; calcined at a temperature of from about 400° F. to about 1200° F. for about ¼ hour to about 4 hours; and, wherein the resultant catalyst is dried at a temperature of from about 180° F. to about 250° F. for about ¼ to about 4 hours.

18. The process according to claim 17 wherein the resultant catalyst is calcined at a temperature of from about 400° F. to about 1200° F., for about ¼ hour to about 4 hours.

19. A process for preparing a methanation catalyst suitable for use in the synthesis of synthetic fuel gas from liquid hydrocarbons comprising, forming a mixture by impregnating alumina with a solution of a nickel compound; drying and calcining the resultant mixture; impregnating the mixture with a solution of a chromium compound and platinum compound; drying the resultant catalyst; and, alternatively, calcining the resultant catalyst.

* * * * *